United States Patent [19]

Tedder

[11] Patent Number: 4,975,554

[45] Date of Patent: Dec. 4, 1990

[54] ROTATING WELD HEAD FOR TUBE INTERIORS

[75] Inventor: Joseph A. Tedder, Windsor, Conn.

[73] Assignee: Combustion Engineering, Inc., Windsor, Conn.

[21] Appl. No.: 906,043

[22] Filed: Sep. 11, 1986

[51] Int. Cl.$^5$ .............................................. B23K 9/032
[52] U.S. Cl. ............................. 219/60 A; 219/125.11; 219/60.2
[58] Field of Search ................... 219/60 A, 60 R, 60.2, 219/125.11, 136, 137 R; 92/31, 33, 116

[56] References Cited

U.S. PATENT DOCUMENTS

| | | | |
|---|---|---|---|
| 1,026,873 | 5/1912 | Locke | 92/116 |
| 3,084,243 | 4/1963 | Gotch | 219/60.2 X |
| 3,121,345 | 2/1964 | Zeigler et al. | 92/116 |
| 3,255,806 | 6/1966 | Meyer et al. | 92/33 X |
| 3,784,782 | 1/1974 | Lochen | 219/60.2 |
| 3,989,223 | 11/1976 | Burkhardt et al. | 92/116 X |
| 4,571,475 | 2/1986 | Rabe | 219/60 A |
| 4,580,028 | 4/1986 | Kobuck et al. | 219/85 R |

Primary Examiner—Teresa J. Walberg
Attorney, Agent, or Firm—John H. Mulholland

[57] ABSTRACT

A welding apparatus (10) for longitudinally traversing and circumferentially welding within the interior of a tube. A rotating weld tip and gas supplying containing head is mounted on and rotationally driven by a rotor tube (36) extending from the end (90) of a cylindrical housing (12) in which it is mounted. The axially fixed rotor (36) is surrounded by and is driven by a helix drive connection (52,54,56) to a piston (20). The piston (20) reciprocates in a cylindrical bore (14) within the housing (12) in response to selectively applied fluid pressure acting against a spring bias (26). A strain gage (72) on the spring (26) controls the fluid pressure by means of valve ("V") whereby reciprocation of the piston (20) rotates the rotor (36) by means of the helical groove (52) and balls (54). The various parts are hollow to accommodate the necessary wire conductors (70,86) and gas flow. A conductive path between the weld tip (32) and outside source of current is supplied through the conductive rotor (36) a slip ring (19) and wires (86).

9 Claims, 1 Drawing Sheet

ROTATING WELD HEAD FOR TUBE INTERIORS

FIELD OF THE INVENTION

The present invention relates to an apparatus for welding the walls of a cylindrical conduit or tube, and more particularly, an apparatus for welding a tube circumferentially to provide internal sleeves or other leak limiting or leak repair weld structure in defective tubes.

BACKGROUND OF THE INVENTION

Interior welding of tubes or other conduits to repair defects or wear within the walls is a necessary and time-consuming task for owners and operators of processes and equipment in which high pressure fluid is transferred. Although many techniques have been developed and used in the prior art for welding of installed tubing, effective interior tube welding is still a challenge to those in the industry. This is due primarily to the difficulty in accessing sections of the installed tubing which may be within a tube bank or pressure vessel. Moreover, since significant structural degradation is likely to have occurred after an extended period of operation under conditions of high pressure, high temperature, and/or corrosive environment, leaking tubes often require the installation of internal liner sleeves with full circumferential welds at each end of the sleeve.

One such application wherein structural integrity of a repaired or "sleeved" tube is critical is in the steam generators of a nuclear powered electric generating plant. In such a plant, the heated primary coolant flows through a plurality of inverted U-shaped tubes immersed in water from which steam is generated.

As it is typical in such an application for the primary side coolant pressure to be higher than that of the secondary, steam producing side, it is apparent that a failure of a steam generator tube or a sleeve repair in such a tube will cause a leakage from the primary coolant into the secondary system.

The occurrence of such leakage is not usual in such units, especially after extended periods of operation. For this reason, welded repairs on the individual steam generator U tubes are performed at regular intervals while the plant is shut down for service.

One welding device for this purpose is the subject of U.S. Pat. No. 4,580,028, issued to Kobuck et al on Apr. 1, 1986. This device, however, has a limited use because it is not fully receivable in a tube to be sleeved or repaired since the rotational drive mechanism must remain outside of the tube. Moreover, in any device in which the weld head is attached to the top of a rigid shaft and the lower end of the shaft has an electric motor that turns the weld head tip, the length of the shaft is the limit of height into a nuclear steam generator tube at which a weld can be made. This height is positively limited by the distance from the lower or tube sheet end of the tube to the bottom of the steam generator because of the rigid drive shaft. To place and weld sleeves at locations high in the steam generator, a flexible shaft for driving the device is, therefore, required. There is a problem in turning a flexible shaft smoothly which has motivated the instant invention in which only the top of the weld head is rotated.

Accordingly, it would be useful to have a welding apparatus of simple and reliable design having a flexible drive which turns only a top weld head and is receivable in the tube for both circumferentially and longitudinally traversing the interior of a nuclear steam generator tube, or the like, to be "sleeved" or otherwise repaired by welding. A simple, low cost rotating head for mounting the weld tip and providing it with a flexible drive shaft, electricity and a supply of inert gas, accordingly, is provided. With the sleeving of failed tubes currently presenting an economically and technically beneficial alternative to the former practice of simply plugging off the failed tube in a nuclear steam generator, the need for such a welding apparatus is readily apparent to those skilled in the art.

SUMMARY OF THE INVENTION

The present invention provides a welding apparatus for welding the interior of a tube and/or repair sleeve wherein the apparatus is receivable in the tube and includes means for rotating a weld tip circumferentially. The outstanding features of the novel mechanism include its low cost, its flexibility, its simplicity, its reliability, and its small size. In use, the assembly is attached to a plastic tube and driven into the steam generator tubes to the desired welding position by a device known as a probe pusher.

The rotating welding tip and inert gas dispersing head is driven by a hollow rotor extending from the head into the end of a cylindrical housing upon which it is mounted. The axially fixed rotor is surrounded by and is driven by a helix drive connection to a piston. The piston reciprocates in a cylindrical chamber within the housing in response to selectively applied fluid pressure acting against a spring bias. A strain gage on the spring controls the pressure whereby reciprocation of the piston rotates the rotor by means of the helix drive. The various parts are hollow to accommodate the necessary gas supply and provide a conductive path to provide current to the weld tip.

In operation, pressured water is applied to the piston in the cylinder to force it longitudinally against the bias of the spring. A slot and pin arrangement is provided which allows the portion of the helix driving means on the piston to move longitudinally only. Balls in the groove of the piston drive through the helix groove on the rotor to convert the longitudinal motion of the piston to rotational motion of the rotor. Upon reducing the water pressure to zero or its original pressure, the spring returns the piston and reverses the rotation of the rotor head to its original circumferential position. The entire welding apparatus may be moved longitudinally in the tube and the process then repeated.

The precise circumferential position is provided by means of the strain gage on the spring as well as the water pressure control and consequent rotational motion.

The present invention, therefore, provides a welding apparatus which is able to provide complete weld coverage for the full circumference and length of the tube.

DESCRIPTION OF THE PREFERRED EMBODIMENT

Figure 1:
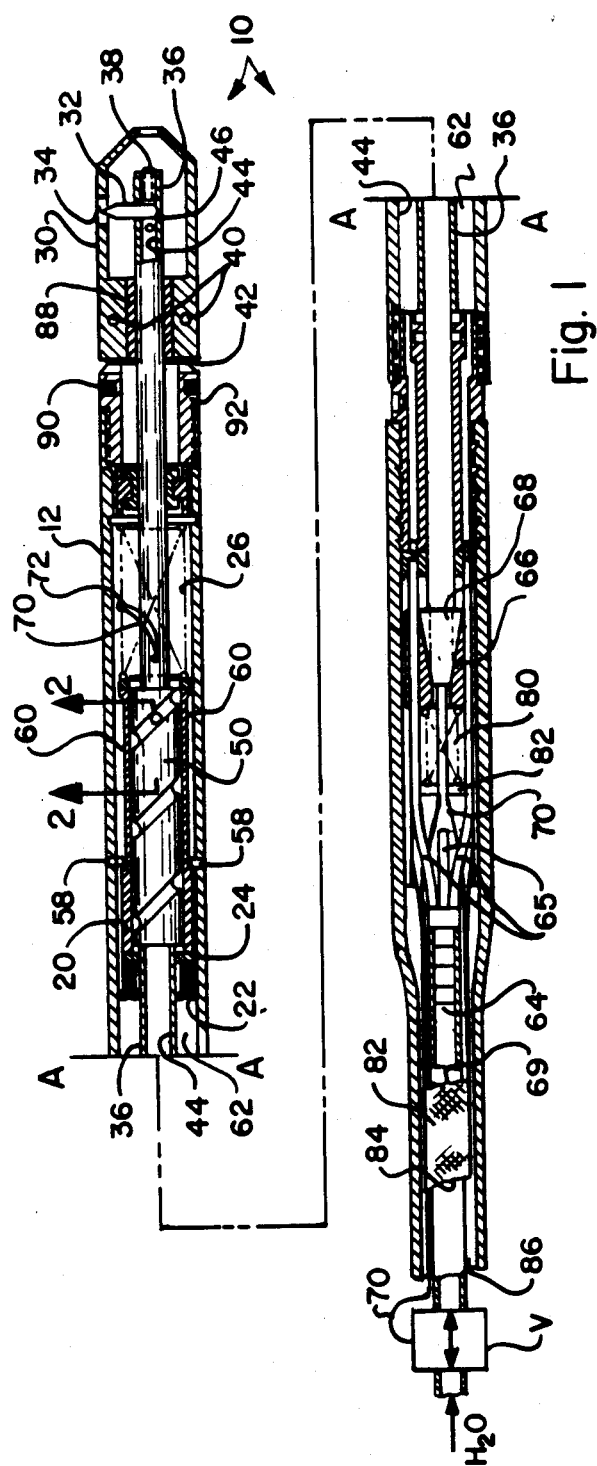
FIG. 1 is a schematic cross-sectional view of a welding apparatus constructed according to the principals of the invention with portions broken away for clarity. It is broken along lines A—A for illustrative purposes only.

The welding apparatus for longitudinally traversing and circumferentially welding the interior of a tube is generally designated by the numeral 10 in the drawing. The welding apparatus 10 includes a substantially hollow elongated housing 12 of a high temperature plastic material called TORLON 4203 which is a polyamideimide material manufactured by AMOCO. The TORLON housing 12 includes a bore 14. A hollow piston 20 in the form of a machined elongated TORLON body is reciprocally mounted in the bore 14. A symmetrical seal 22 of BUNA-N or similar material and a TEFLON washer 24 creates a sliding fluid seal between piston 20 and the wall of the bore 14. Piston 20 is biased in one direction by means of a spring 26.

At the end of housing 12 opposite the direction of bias of piston 20 is a rotatable weld head 30. The weld head 30 includes a weld tip 32 and inert gas dispensing opening 34 and an elongated hollow conductive tube 36 having a threaded screw 38 in the end thereof. The outer structure of the weld head 30 is in the form a nose cover or shroud of stainless steel which is clamped by means of fasteners 40 in position at the end of the housing 12 on the tube 36. A suitable thrust bearing 42 is provided between the housing 12 and the weld head 30.

The tube 36 is fixed to and extends from the weld head into the housing 12 and its hollow center 44 conducts inert gas to the gas dispensing opening 34 by means of opening 46 and the hollow internal cavity of the shroud 30.

Figure 2:
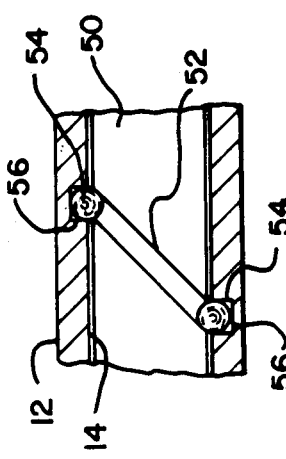
FIG. 2 is an enlarged sectional view along the lines 2—2 of FIG. 1 taken in the direction of the arrows.

The tube 36 is electrically conductive and conducts current through the housing 12 to the weld tip 32. The tube 36 has a radially enlarged portion 50 which includes means which convert reciprocal motion of the piston 20 into rotary motion of the weld head 30. The enlarged portion 50 of tube 36 includes a helical groove 52 with rotating balls 54 partially therein and partially in grooves 56 in piston 20, as best seen in FIG. 2. The reciprocating piston 20 is secured against rotation by means of pins 58 in longitudinal slots 60 on the outside of the piston 20. Thus, reciprocation of the piston 20 rotationally drives tube grooves 56, balls 54 and helix groove 52 in the manner of a lead screw and nut drive, making the entire head 30 and tube 36 rotate as a rotor in response to reciprocal motion of the piston 20.

Selectively applied fluid pressure in chamber 62 of bore 14 drives the piston 20 through seal means 22 against the bias of spring 26. The fluid pressure is preferably supplied to chamber 62 through a hollow fitting assembly 64 connected by means of a conduit exterior source of selectively pressurized water. Suitable solenoid valve(s) control the application of pressure to chamber 62 and flow of water in two directions in the system as the piston 20 reciprocates against a bias of spring 26, and as the bias of spring 26 moves the piston to expel the water from the chamber 62.

The connection between chamber 62 and fitting 64 is by several channels 65 which diverge outwardly to pass outside of the tube 36 and its conductive bearing seat or slip ring 66. The bearing seat 66 and tapered portion 68 integrally attached to the end of tube 36 are hollow such that gas flowing through a gas supply conduit 69, around fluid fitting 64 and the water conduit supplying it, can pass axially along the various structural parts into the tube 36.

In addition to acting as a gas passageway, these hollow parts, and the conduit they form, provide a means for the threading of strain gage wires 70 down the interior of the device. The strain gage wires 70 are attached to a strain gage 72 on spring 26. The wires 70 extend into the tube 36 and down the hollow structure including gas conduit 69, and around the fluid conduit fitting 64 and its passages 65 through which water passes to chamber 62. Water is supplied to the fitting 64 and via conduit 65 to the chamber 62 from means supplying selectively controlled pressurized water which is the schematically shown two-way solenoid valve labeled V in the drawing.

The selective controlling is such that as the strain gage 72 senses strain in spring 26, the pressure is brought up to exceed that of the spring 26 and head 30 rotates. It then may be reversed to provide less than that force on the piston provided by the bias of spring 26 and all the way down to 0. In any event, the pressurized fluid supply is in proportion to the extent of piston travel against the spring bias, as sensed from the spring 26, since the wires 70 are connected to the solenoid valve control.

The conductive path is through the tube 36 from slip ring 66. An outside supply of electricity to the slip ring is provided by means of conductive spring 80 and washer and copper braid connector 84 on the outside of gas conduit 82. Alternatively, other conductive means passing through the hollow housing 12 or any of the conduits previously described therein, such as do the wires 70 of the strain gage, may supply current to strip ring 66.

In this regard, it will be noted that the conductive wires can be either inside or outside of braided shield 84, but that ultimately they must pass inwardly to the inside opening of bore 44 of the tube 36 all the way to the weld head 30.

It will be appreciated that the rotation is limited by the length of the strain gage wire 70. However, as long as the welding head is able to turn the full 360°, it is able to accomplish the internal circumferential welds required for repairing tubes. In a typical welding apparatus constructed according to the invention, the wires 70 and 86 are long enough for approximately 450° of rotation.

Because the tube 36 is conductive, an insulating block 88 is provided to insulate the weld head 30, which can be either of stainless steel or of a structural plastic material of high heat resistance. Obviously, the stainless steel is preferred for its heat resisting qualities.

A silicone O-ring 90, such as a Parker No. 013 may be provided at the end of the housing 12. It is conveniently mounted on a threaded cap 92, threadedly engaging the end of the bore 14. The O-ring prevents the flow of the gas in a rearward direction within the tube and also centers the housing in tube. It has been found, however, that because of the small space between the welding head 30 and the interior of the tube being circumferentially welded, that the inert gas emanating from tube 36 through opening 46 and from the interior of the head 30 through opening 34 in the neighborhood of weld tip 32, is sufficiently confined to remain in the neighborhood of the weld tip and act as the required gas shield even without a seal on the outer exposed end or nose of the weld head weld head 30.

It will be appreciated by those skilled in the art, that a welding apparatus constructed according to the principals of the present invention as described, is able to produce a complete circumferential weld of the tube wall in a single rotation of 360°. Moreover, it is to be understood that the appended drawing and proceeding discussion have been primarily directed toward the illustrative, preferred embodiment of the present invention, and that equivalent embodiments utilizing functionally and/or structurally equivalent components which are or become apparent to those skilled in the art are also within the scope of the proceeding disclosure and the following claims.

What is claimed is:

1. A welding apparatus for making circumferential welds within a tube comprising in combination:
    an elongated cylindrical housing of a dimension permitting it to be receivable in a tube for making circumferential welds within said tube;
    a rotatable weld head at one end of said housing of a dimension permitting it to be receivable in said tube for making circumferential welds within said tube;
    said weld head including a weld tip, an inert gas dispensing opening and means to conduct an electrical current to said weld tip;
    said cylindrical housing including a bore;
    a reciprocating rotationally fixed piston biased in one direction within said bore and a pressurized fluid chamber for supplying fluid to drive said piston against said bias;
    means fixed to and extending from said weld head into said housing for conducting gas and electrically to said gas dispensing opening and said means to conduct an electrical current in said weld head;
    said means extending from said weld head being connected to said piston by means which convert reciprocal motion of said rotationally fixed piston into rotary motion of said weld head;
    means which include means sensing the extent of piston motion supplying selectively controlled pressurized fluid from outside said tube to said pressurized fluid chamber of said housing when said housing and rotating head are inside said tube; and
    means supplying gas and electrically from outside said tube to said means fixed to and extending from said weld head into said housing when said housing and rotating head are inside said tube.

2. The welding apparatus of claim 1 in which the piston is rotationally fixed by means of a pin riding in a slot in the piston.

3. The welding apparatus of claim 1 in which spring means bias the piston.

4. The welding apparatus of claim 3 in which a strain gage acts as the means sensing the extent of piston motion and is connected to sense strain in the spring means and wires from the strain gage extend axially along said housing bore for connection to said means supplying selectively controlled pressurized fluid from outside said tube, whereby pressurized fluid supplied is in proportion to the extent of piston travel against the spring bias, as sensed from the spring.

5. The welding apparatus of claim 1 in which the pressurized fluid is selectively controlled by a solenoid valve in a line from a pressurized fluid source.

6. The welding apparatus of claim 1 in which the fluid is water.

7. The welding apparatus of claim 1 in which the means which convert reciprocal motion of said rotationally fixed piston into rotary motion of said weld head includes rotating ball containing grooves in said piston and in the means fixed to and extending from said weld head.

8. The welding apparatus of claim 1 in which the means supplying pressurized fluid from outside said tube is flexible.

9. A welding apparatus for making circumferential welds within a tube comprising:
    an elongated cylindrical housing receivable in a tube;
    a rotatable weld head at one end of said housing receivable in said tube;
    said weld head including a weld tip, an inert gas dispensing opening and means to conduct an electrical current to said weld tip;
    said cylindrical housing within said tube including a bore;
    a reciprocating rotationally fixed piston biased by spring means in one direction within said bore and a pressurized fluid chamber for supplying fluid to drive said piston against said bias;
    means fixed to and extending from said weld head into said housing for conducting gas and electricity to said gas dispensing opening and said means to conduct an electrical current in said weld head;
    said means extending from said weld head being connected to said piston by means which convert reciprocal motion of said rotationally fixed piston into rotary motion of said weld head;
    means supplying selectively controlled pressurized fluid from outside said tube to said pressurized fluid chamber of said housing when said housing and rotating head are inside said tube;
    a strain gage connected to sense strain in the spring means and wires from the strain gage extending axially along said housing bore for connection to said means supplying selectively controlled pressurized fluid from outside said tube, whereby pressurized fluid supplied is in proportion to the extent of piston travel against the spring bias, as sensed from the spring; and
    means supplying gas and electrically from outside said tube to said means fixed to and extending from said weld head into said housing when said housing and rotating head are inside said tube.

* * * * *